(12) United States Patent
Skinner et al.

(10) Patent No.: US 7,375,277 B1
(45) Date of Patent: May 20, 2008

(54) DOUBLE FLANGED BUSHINGS AND INSTALLATION METHODS

(75) Inventors: William A. Skinner, Seattle, WA (US); Jude H. Restis, Kent, WA (US); Mark R. Weiss, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 0 days.

(21) Appl. No.: 09/603,857

(22) Filed: Jun. 26, 2000

(51) Int. Cl.
*H05K 5/00* (2006.01)
(52) U.S. Cl. .............................. 174/18; 29/525; 29/523
(58) Field of Classification Search ............. 72/370.07; 29/522.1, 525, 523, 512, 243, 519; 403/408.1, 403/388, 277, 282
See application file for complete search history.

(56) References Cited

U.S. PATENT DOCUMENTS

| 295,593 | A |  | 3/1884 | Thayer | |
|---|---|---|---|---|---|
| 1,979,686 | A | * | 11/1934 | Hall et al. | 29/523 |
| 2,188,596 | A | * | 1/1940 | Hobert | 16/2.1 |
| 2,661,182 | A | * | 12/1953 | Kipp | 137/625.68 |
| 2,700,172 | A |  | 1/1955 | Rohe | |
| 3,244,034 | A | * | 4/1966 | Severdia | 408/72 B |
| 3,252,493 | A |  | 5/1966 | Smith | 151/41.7 |
| 3,693,247 | A |  | 9/1972 | Brown | 29/512 |
| 3,835,525 | A |  | 9/1974 | King, Jr. | 29/412 |
| 3,875,649 | A | * | 4/1975 | King, Jr. | 29/523 |
| 3,949,535 | A |  | 4/1976 | King, Jr. | 52/758 |
| 4,164,807 | A | * | 8/1979 | King, Jr. | 29/523 |
| 4,471,643 | A |  | 9/1984 | Champoux et al. | 72/391 |
| 4,482,089 | A | * | 11/1984 | Lindahl et al. | 29/523 |
| 4,557,033 | A | * | 12/1985 | Champoux | 29/525 |
| 4,699,212 | A | * | 10/1987 | Andersson et al. | 29/523 |
| 4,787,793 | A |  | 11/1988 | Harris | 411/339 |
| 4,809,420 | A |  | 3/1989 | Landy et al. | 29/523 |
| 5,093,957 | A |  | 3/1992 | Do | 16/2 |

(Continued)

FOREIGN PATENT DOCUMENTS

DE 8901317 U1 3/1989

(Continued)

OTHER PUBLICATIONS

Merriam Webster's Collegiate Dictionary, Tenth Edition, 1997, p. 154.*

*Primary Examiner*—David P. Bryant
*Assistant Examiner*—Christopher M Koehler
(74) *Attorney, Agent, or Firm*—Seed IP Law Group PLLC

(57) ABSTRACT

A dual bushing installation kit includes a first metal bushing and a second metal bushing. The first metal bushing can include a first body having first and second ends. The first and second ends are connected by a first outer surface having a first outer circumference and a first inner surface having a first inner circumference. The second metal bushing is defined by a second body having first and second ends. The first and second ends are connected by a second outer surface having a second outer circumference and a second inner surface having a second inner circumference. The second outer circumference is dimensioned to be substantially conforming with the first inner circumference such that the second bushing is closely receivable by a first opening of the first bushing. Both the second outer circumference and the first inner circumference can be expanded in an outwardly radial direction.

14 Claims, 6 Drawing Sheets

U.S. PATENT DOCUMENTS

| | | | |
|---|---|---|---|
| 5,103,548 A * | 4/1992 | Reid et al. | 29/507 |
| 5,129,253 A * | 7/1992 | Austin et al. | 29/523 |
| 5,433,100 A | 7/1995 | Easterbrook et al. | 72/391.2 |
| 5,609,434 A | 3/1997 | Yehezkieli et al. | 403/260 |
| 5,722,312 A | 3/1998 | Kristensen | 92/171.1 |
| 5,885,318 A * | 3/1999 | Shimizu et al. | 65/493 |
| 6,289,577 B1 * | 9/2001 | Tanaka et al. | 29/523 |
| 6,328,513 B1 | 12/2001 | Niwa et al. | 411/339 |
| 6,488,460 B1 | 12/2002 | Smith et al. | 411/353 |
| 6,796,765 B2 | 9/2004 | Kosel et al. | 415/142 |

FOREIGN PATENT DOCUMENTS

| | | |
|---|---|---|
| EP | 0 891 007 A1 | 1/1999 |
| EP | 000891007 A1 * | 1/1999 |
| EP | 0 945 919 A1 | 9/1999 |
| EP | 01 20 2458 | 5/2002 |
| JP | 57137031 | 8/1982 |
| JP | 61157846 | 7/1986 |

* cited by examiner

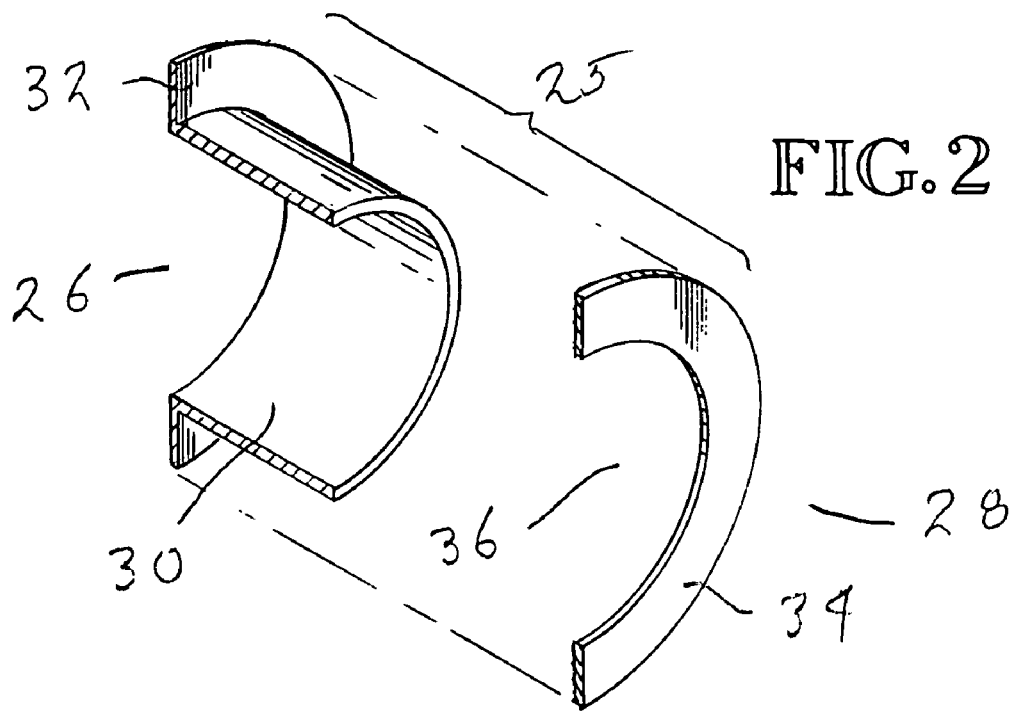
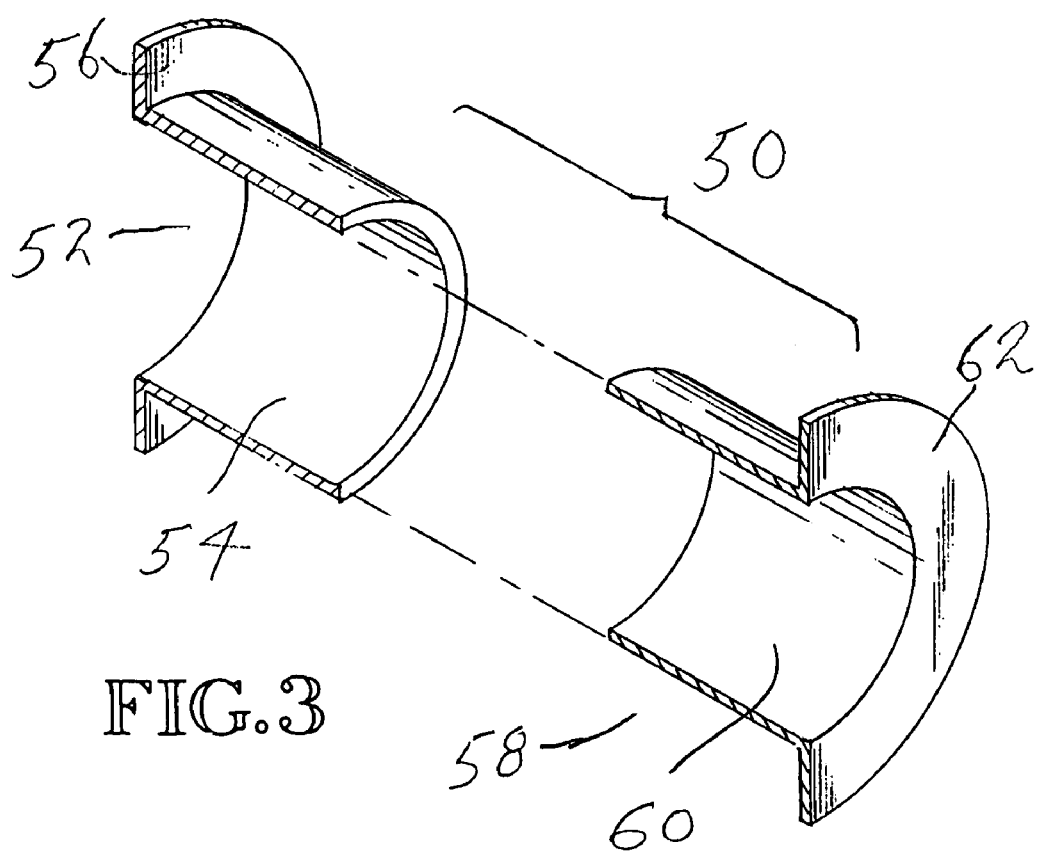

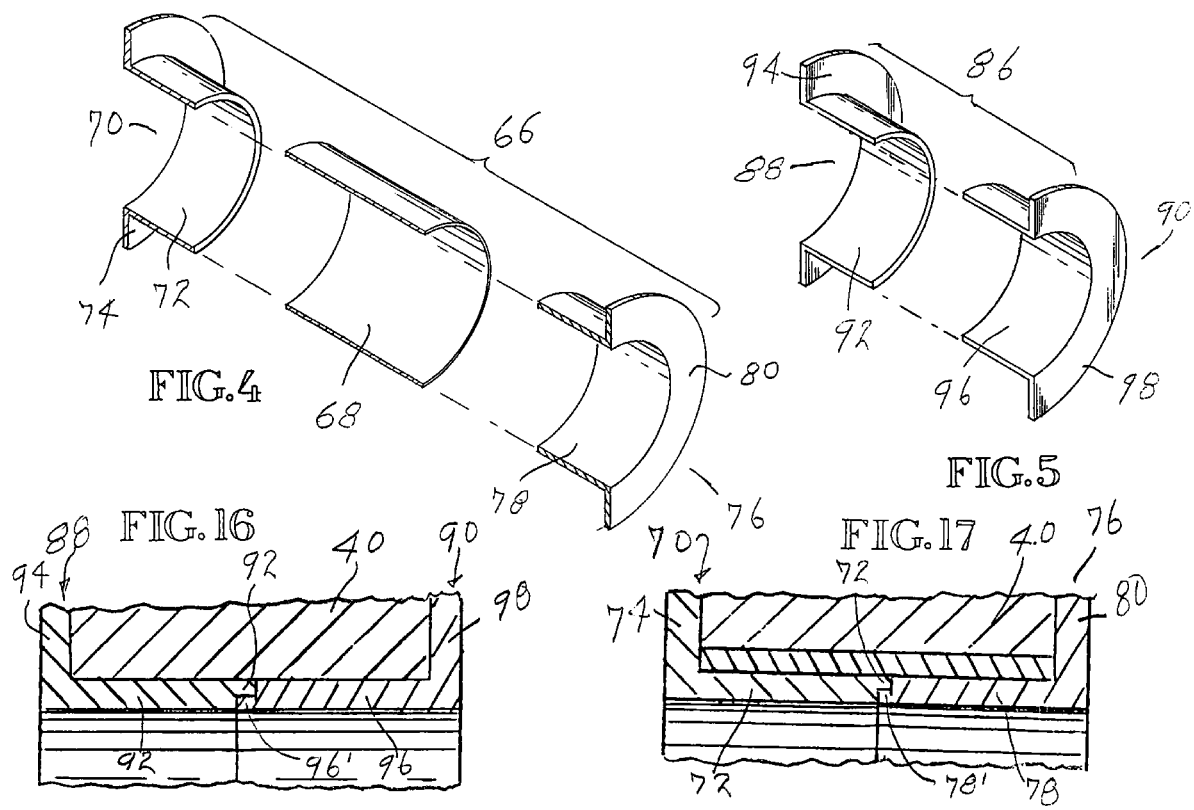

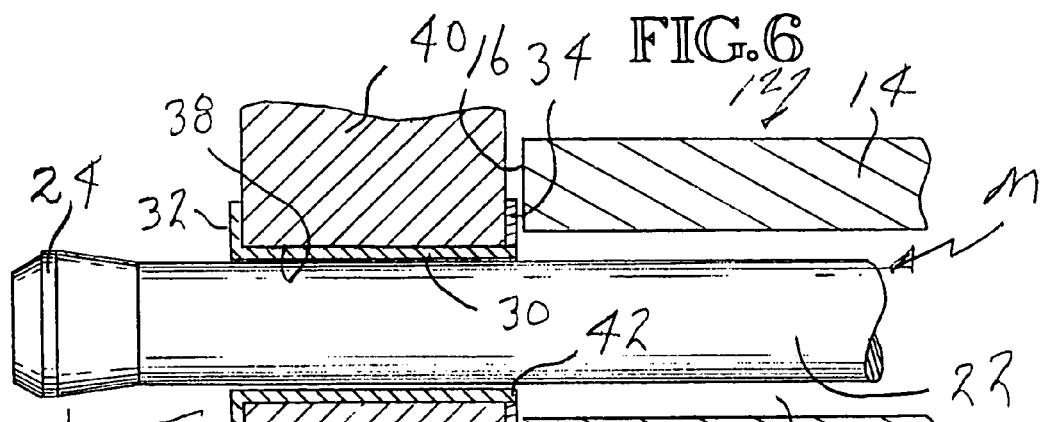
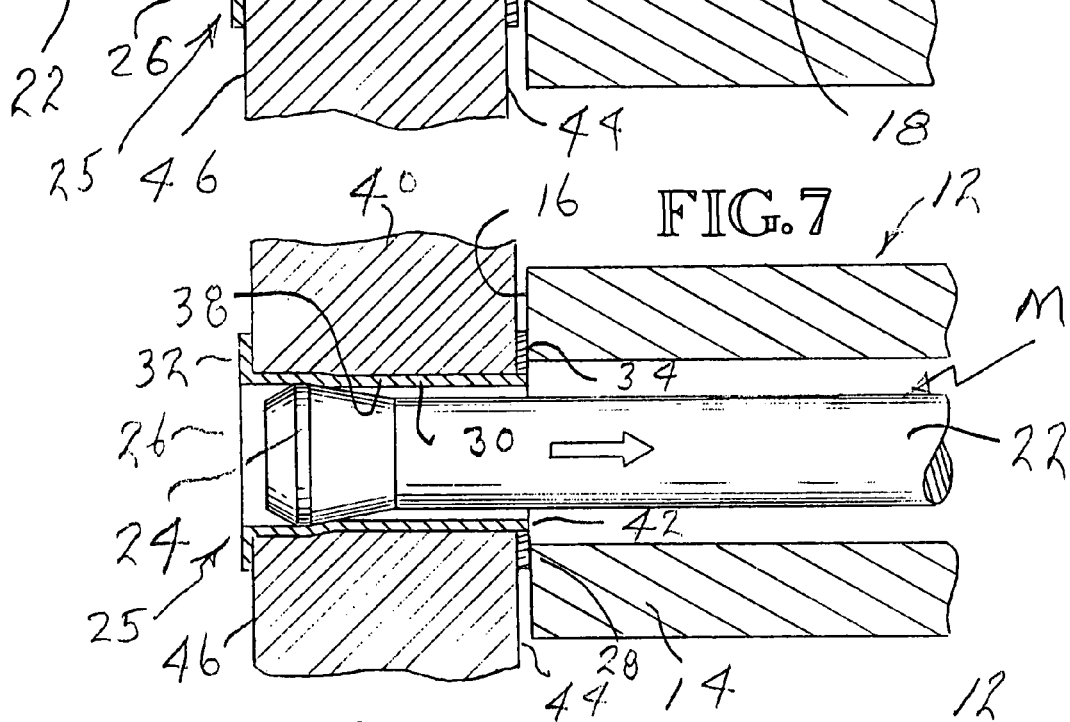
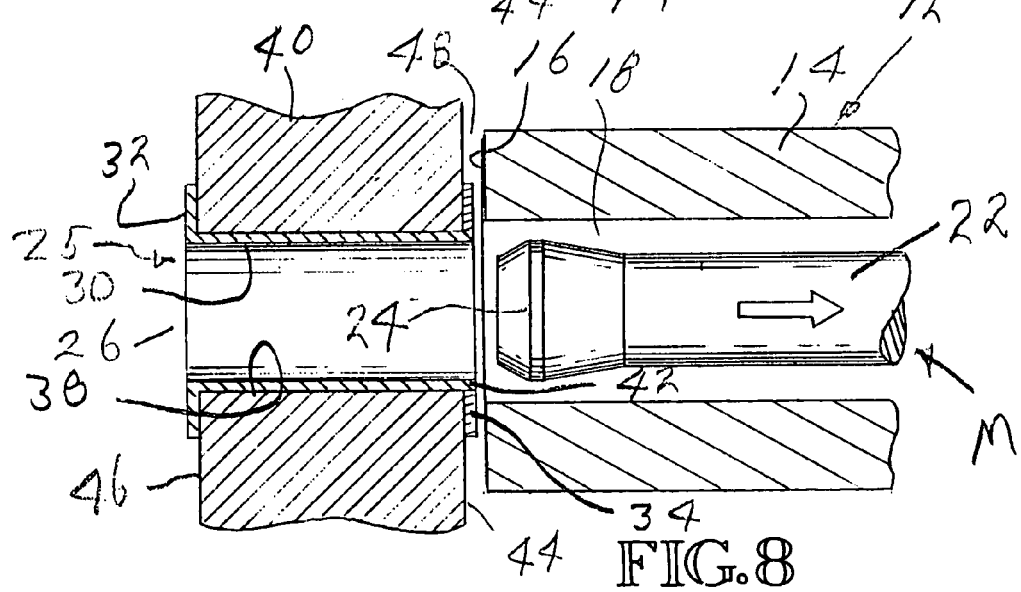

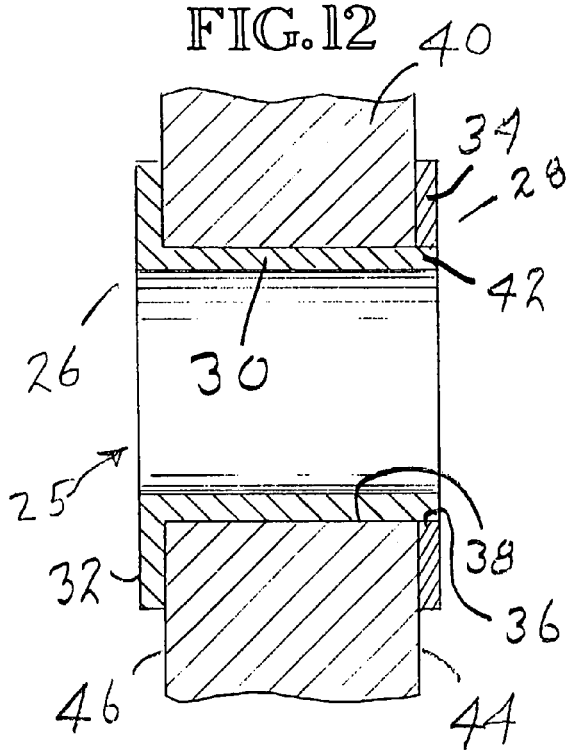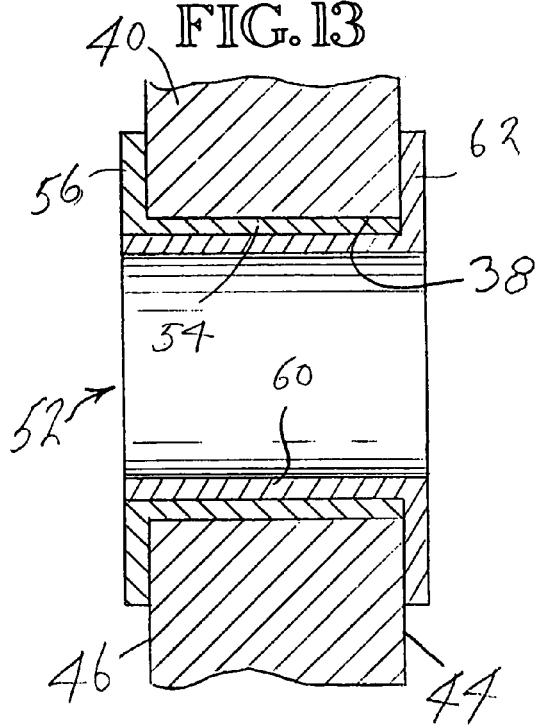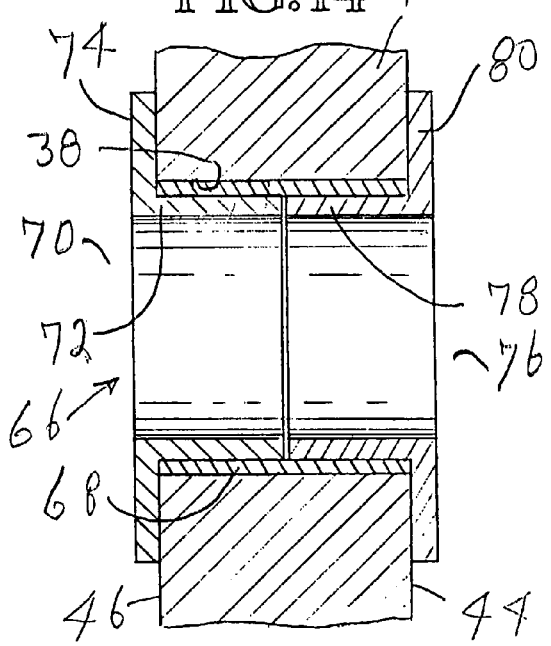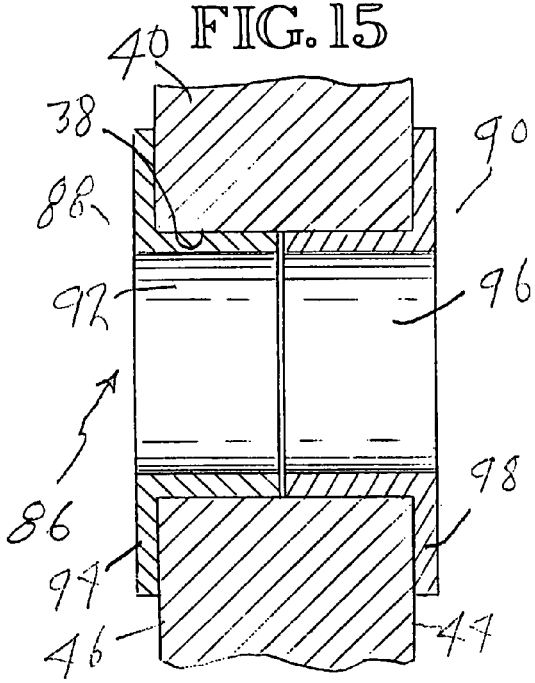

DOUBLE FLANGED BUSHINGS AND INSTALLATION METHODS

TECHNICAL FIELD

The present invention relates to the provision and installation of tubular bushings in openings in work members. More particularly, it relates to the provision of bushings having flanges at both ends and to methods of radially expanding tubular portions of the bushings to create a tight interference fit between them and the openings in the work member.

BACKGROUND OF THE INVENTION

It is known to secure a bushing within an opening in a structural wall by positioning the bushing within the opening, holding it in place, and then forcing an expansion mandrel through the bushing to radially expand the bushing into an interference fit with the opening.

U.S. Pat. No. 4,809,420, granted Mar. 7, 1989, to Michael A. Landy, Todd L. Thompson and Larry I. Wiemann, and U.S. Pat. No. 5,433,100, granted Jul. 18, 1995, to Eric T. Easterbrook, Todd L. Thompson and Mark R. Weiss, both disclose the use of a mandrel alone for installing bushings in openings in a work member.

U.S. Pat. No. 4,557,033, granted Dec. 10, 1985, to Robert L. Champoux, discloses using a mandrel alone for cold expanding an opening in a work member for the purpose of introducing fatigue life enhancing compressive residual stresses in the work member immediately around the opening in the work member.

U.S. Pat. No. 5,103,548, granted Apr. 14, 1992, to Leonard F. Reid and Roger T. Dolstad discloses the use of a mandrel and a split sleeve together for installing a tubular bushing in an opening in a work member and at the same time introducing fatigue life enhancing compressive residual stresses in the work member.

The contents of U.S. Pat. Nos. 4,557,033; 4,809,420 and 5,103,548 are hereby incorporated herein by this specific reference.

U.S. Pat. No. 3,835,688, granted Sep. 17, 1974, to John O. King, Jr. and U.S. Pat. No. 3,949,535, granted Apr. 13, 1976, also to John O. King, Jr. each discloses a method of both installing a seamless tubular member in openings in two members to be joined and expanding the material immediately surrounding the openings for the purposes of fatigue life enhancement. The seamless tubular members disclosed by these patents have a flange at one end that contacts the side of one of the members from which the tubular member is inserted. U.S. Pat. No. 3,949,535 discloses providing a flare on the end of the sleeve opposite the flange to assist in retaining the sleeve in the opening in the workpiece. This flare is formed by the movement of the mandrel through the sleeve and it requires a particular end construction of the sleeve.

Thus, it is known to provide a bushing with a radial flange at one of its ends. There is a need for providing a bushing that has a radial flange at each of its ends. For example, when bushings are used in a lug or clevis, there is a potential of face-to-face contact between the joined parts. Flanges on both ends of the bushing would protect the face-to-fact contact of the parent material in which the bushing has been installed. The flanges could be used to react a load applied to the lug or clevis along a line parallel to the bore of the lug or clevis. For example, in a landing gear lug on an aircraft, the lug might see a load transmitted to the pin through the lug perpendicular to the axis of the bore, due to the weight of the aircraft. However, it could also see an axial load due to the fore and aft loading of the lug. A second flange on a bushing could also be used to provide a surface on which a nut and washer may seat when a threaded pin is used to retain the pin in the joint. The principal object of the present invention is to provide tubular bushings having flanges at both of their ends. Another object is to provide methods of making and installing tubular bushings that have flanges at both ends.

U.S. Pat. Nos. 3,835,688 and 3,949;535, and the other above-identified patents should be carefully considered for the purpose of putting the present invention into proper prospective relative to the prior art.

BRIEF SUMMARY OF THE INVENTION

According to the present invention, a workpiece is provided that includes first and second sides and a cylindrical opening extending through it between the two sides. A bushing is provided that includes a tubular center portion that is placed within the cylindrical opening. A first radial flange is connected to the tubular center portion of the bushing on the first side of the work member. This flange extends radially outwardly from the tubular center portion of the bushing, in contact with the first side of the work member. A second radial flange is connected to the tubular center portion of the bushing on the second side of the work member. This second radial bushing extends radially outwardly from the tubular center portion of the bushing, in contact with the second side of the work member. The tubular center portion of the bushing is radially expanded in the cylindrical opening to such an extend that it makes a tight interference fit within the opening and connects the bushing to the work member.

According to one aspect of the invention, the tubular center portion of the bushing is a single continuous tubular member that is connected at one end to the first flange and which includes a second end portion that extends axially outwardly beyond the second side of the work member. The second flange is a radial member having a center opening in which the projecting end portion of the tubular member is received. The tubular member is radially expanded in the center opening of the second flange to such an extent that it makes a tight interference fit with the opening in the second flange and connects the second flange to the tubular member.

According to another aspect of the invention, the bushing is composed of a first bushing part that includes the first flange and a first tubular member that is connected to the first flange, and a second bushing part that includes the second flange and a second tubular member that is connected to the second flange. The two tubular members together form at least a part of the central portion of the bushing. The first tubular member may extend substantially completely through the opening and the second tubular member may be positioned in the first tubular member and extends substantially completely through it. The two tubular members are concentric. The radial expansion connects the first tubular member to the sidewall of the opening and connects the second tubular member to the first tubular member.

According to another aspect of the invention, the first tubular member extends axially from a first flange into and partially through the cylindrical opening in the work member. The second tubular member extends from the second flange into and partially through the opening in the work member, coaxial with the first tubular member. The outside diameters of the tubular members may be close in size to the inside diameter of the opening, so that when radially expanded, the two tubular members make a tight interference fit with the opening in the work member. Or, the first and second tubular members may be surrounded by a third tubular member, in which case the radial expansion connects the first tubular member to the sidewall of the opening in the work member and connects the second and third tubular members of the bushing parts to the first tubular member. That is, the third tubular member makes a tight interference fit with the cylindrical opening in the work member and the second and third tubular members make tight interference fits with the first tubular member.

The present invention also includes methods for installing double flanged bushings in openings in work members. According to a first method aspect of the invention, a work member is provided that has a first side and an opposite second side. A cylindrical through opening is provided in the work member, extending from the first side to the second side. A first bushing part is provided that has a tubular section and a radial flange section at one end of the tubular section. The tubular section has an outside diameter substantially corresponding to the diameter of the through opening in the work member. The tubular section of the first bushing part is inserted into and through the opening in the work member, from the first side of the work member. The first bushing part is moved axially to place its flanged section against the first side of the work member. The tubular section of the first bushing part is of such a length that when the flange section is against the first side of the work member, the tubular section has an end portion opposite the flanged section that projects axially outwardly of the opening, beyond the second side of the work member. A second bushing part includes a center opening that is sized to receive the projecting end portion of the tubular section of the first bushing part. The second busing part extends radially outwardly from this center opening. The second bushing part is positioned on the projecting end portion of the tubular section of the first bushing part and is moved substantially against the second side of the work member. Then, the tubular section of the first bushing member is radially and circumferentially expanded an amount sufficient to provide a tight interference fit between it and the through opening in the work member and between its projecting end portion and the opening in the second bushing part. This connects the first bushing part to the work member and connects the second bushing part to the projecting end portion of the tubular section of the first bushing part, such that the second bushing part functions as a second flange at the end of the first bushing part that is opposite the flange section of the first bushing part.

The tubular section of the bushing part may be radially expanded an amount sufficient to also introduce fatigue life enhancing compressive residual stresses in the work member immediately around the opening in the work member.

The cold expansion of the tubular section, both for connecting it to the work member and the second bushing part, and for introducing fatigue life enhancing compressive residual stresses in the work member, may be accomplished by moving a tapered mandrel axially through the first bushing part, and providing the mandrel with a large diameter end portion that is sized such that when it moves through the tubular section of the first bushing part it will radially expand the tubular section of the first bushing part to the extent needed.

According to another aspect of the invention, a first bushing part is provided that has a tubular section and a radial flange section at one end of its tubular section. The tubular section of the first bushing part is provided with an outside diameter substantially corresponding to the diameter of the opening in the work member. The second bushing part is provided that has a tubular section and a radial flange section at one end of its tubular section. The tubular section of the second bushing part is provided with an outside diameter substantially corresponding to the inside diameter of the tubular section of the first bushing part. The tubular section of the first bushing part is moved into and through the opening in the work member, from the first side of the work member. It is moved axially until its flange section is substantially against the first side of the work member. Then, the tubular section of the second bushing part is inserted into the tubular section of the first bushing part, from the second side of the work member. The second bushing part is then moved axially to place its flange section substantially against the second side of the work member. The tubular sections of the first and second bushing parts are radially and circumferentially expanded together, an amount sufficient to provide a tight interference fit of the tubular section of the second bushing part in the tubular section of the first bushing part, and a tight interference fit of the tubular section of the first bushing part in the opening in the work member. They also may be radially and circumferentially expanded an amount sufficient to also introduce fatigue life enhancing compressive residual stresses in the work member immediately around the opening in the work member.

According to a further aspect of the invention, a first bushing part is provided that has a tubular section and a radial flange at one end of the tubular section. The tubular section has an outside diameter substantially corresponding to the diameter of the opening in the work member and a length that is only a portion of the length of the opening in the work member. A second bushing part is provided that has a tubular section and a radial flange at one end of the tubular section. This tubular section also has an outside diameter substantially corresponding to the diameter of the opening in the work member and a length that is less than the length of the opening in the work member. The tubular section of the first bushing part is inserted into the opening in the work member, from the first side of the work member, and is moved axially to place the flange section of the first bushing part against the first side of the work member. The tubular section of the second bushing part is inserted into the opening in the work member, from the second side of the work member, and is moved axially until the flange section of the second bushing part is against the second side of the work member. Then, the two tubular sections are radially and circumferentially expanded an amount sufficient to provide a tight interference fit between them and the opening in the work member, for connecting the first and second bushing parts to the work member. The cold expansion may also be sufficient to introduce fatigue life enhancing compressive residual stresses in the work member immediately around a through opening in the work member.

According to yet another aspect of the invention, a tubular first bushing part is provided that has an outside diameter substantially corresponding to the diameter of the opening in the work member and a length substantially corresponding to the length of the opening in the work member. A second bushing part is provided that has a tubular section and a radial flange section at one end of the tubular section. The tubular section of the second bushing part has an outside diameter substantially corresponding to the inside diameter of the first bushing part and a length that is a portion of the length of the first bushing part. A third bushing part is provided. It has a tubular section and a radial flange section at one end of the tubular section. The tubular section of the third bushing part also has an outside diameter substantially conforming to the inside diameter of the first bushing part and a length that is a portion of the length of the first bushing part. The first bushing part is inserted into the opening in the work member. Then, the tubular section of the second bushing part is inserted into the first bushing part, from the first side of the work member. The second bushing part is moved axially until its flange section is against the first side of the work member. Next, the tubular section of the third bushing part is inserted into the first bushing part, from the second side of the work member. The third bushing part is moved axially until its flange section is against the second side of the work member. Then, the first bushing part and the tubular sections of the second and third bushing parts are radially expanded together an amount sufficient to provide a tight interference fit between the first bushing part and the opening in the work member and between the tubular sections of the second and third bushing parts and the first bushing part. The bushing parts are expanded circumferentially an amount sufficient to connect the second and third bushing parts to the first bushing part and connect the first bushing part to the work member. They also may be radially expanded an amount sufficient to introduce fatigue life enhancing compressive residual stresses in the work member substantially surrounding the through opening in the work member.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 2 is a pictorial view in longitudinal section of two flanged bushing that forms a part of the present invention;

FIG. 3 is a view like FIG. 2, showing a second two flanged bushing that is a part of the present invention;

FIG. 4 is a view like FIGS. 2 and 3, showing a third two flanged bushing that is a part of the invention;

FIG. 5 is a view like FIGS. 2-4 showing a fourth two flanged bushing that is a part of the present invention;

FIG. 6 is a fragmentary sectional view showing the tooling of FIG. 1 being used to install a bushing of the type shown by FIG. 2, such view showing a first bushing part having a tubular portion that is in an opening in the wall and a radial flange at one end that is against a first side of the wall, and a second bushing part in the form of an annular member surrounding an end part of the tubular portion of the first bushing part that projects outwardly of the opening, beyond the second side of the work member, and such view showing a mandrel in an extended position within the tubular portion of the first bushing part;

FIG. 7 is a view like FIG. 6 but showing the mandrel being retracted and showing an enlarged end portion of the mandrel radially expanding the tubular portion of the first bushing part as it moves through it;

FIG. 8 is a view like FIGS. 6 and 7, showing the mandrel in a retracted position and the nose piece of the puller tool being moved away from the installed bushing;

FIG. 12 is a longitudinal sectional view showing a bushing of the type shown in FIG. 2 installed in an opening in a work member;

FIG. 13 is a view like FIG. 12, but showing a bushing of the type shown by FIG. 3;

FIG. 14 is a view like FIGS. 12 and 13, but showing a bushing of a type shown by FIG. 4;

FIG. 15 is a view like FIGS. 12-14, but showing a bushing of the type shown by FIG. 5;

FIG. 16 is an enlarged scale fragmentary view of an upper central portion of FIG. 15, such view showing that the bushing end parts may have concentric lapping portions where they meet; and FIG. 17 is a view like FIG. 16, but of the upper central region of FIG. 14, such view showing that the end parts of the bushing can have concentric lapping portions where they meet, the same as shown in FIG. 16.

DETAILED DESCRIPTION OF THE INVENTION

Figure 1:
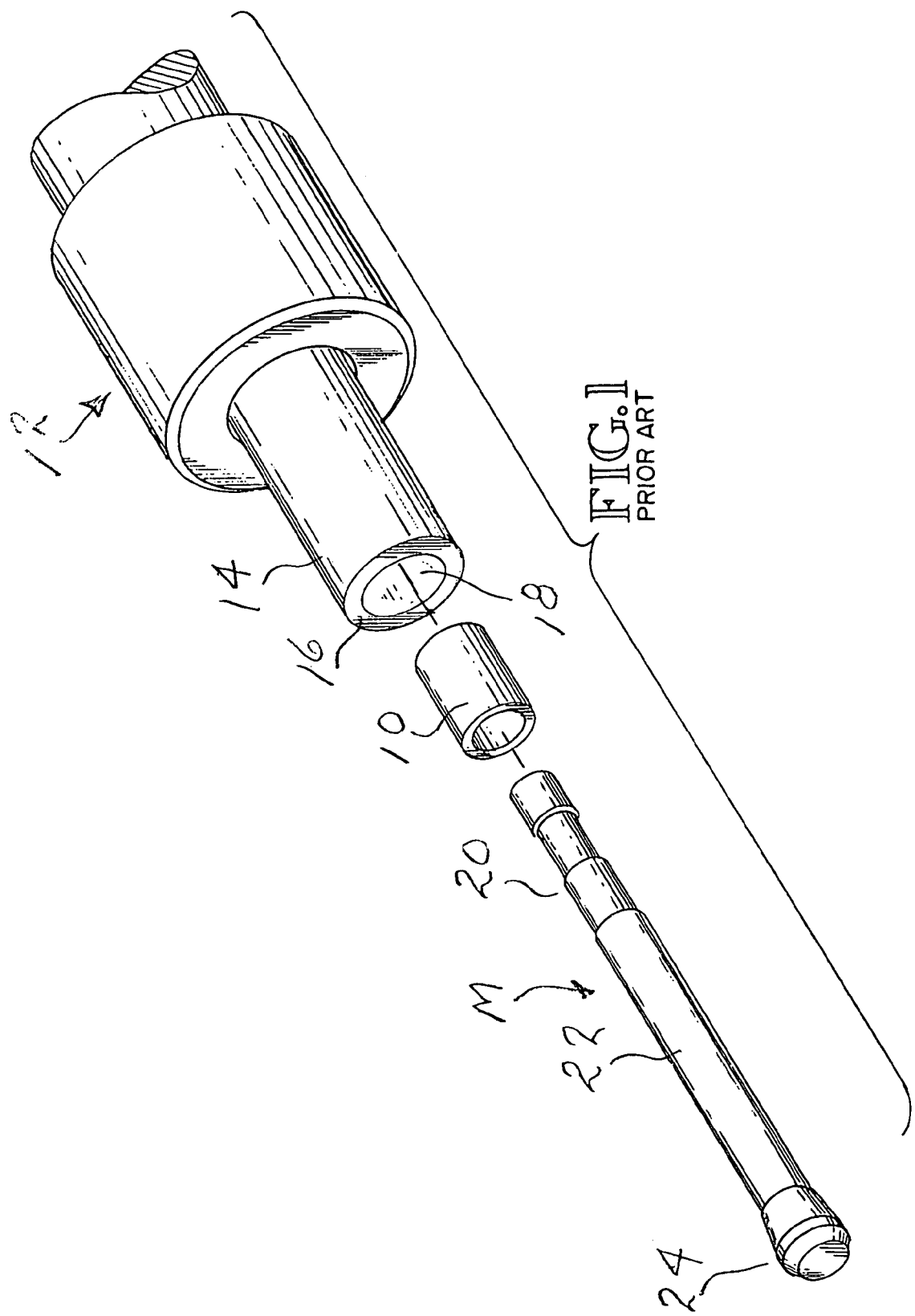
FIG. 1 is an exploded pictorial view of prior art tooling for installing a tubular bushing in an opening in a work member.

FIG. 1 shows prior art tooling for installing a prior art bushing 10. The tooling includes a puller 12 that includes a nose piece 14 having a forward end surface 16 and a mandrel receiving opening 18. In this system, the mandrel M includes a small diameter inner end portion 20 that extends into the puller 12 via the opening 18. It further includes a bushing receiving central portion 22 and an enlarged end portion 24. In this system, it is necessary to slide the bushing 10 onto the mandrel from the smaller end of the mandrel M and then insert the mandrel into the puller and connect it to a piston that is inside the puller 12. This installation of the mandrel M is shown by the aforementioned U.S. Pat. Nos. 4,809,420 and 5,433,100. Reference is made to U.S. Pat. No. 5,433,100 for a more complete description and disclosure of the mandrel and puller assembly.

FIGS. 2, 6-8 and 12 disclose a first embodiment of the double flanged bushings of the present invention. This bushing 25 is composed of a first bushing part 26 and a second bushing part 28. Bushing part 26 comprises a tubular section 30 and a radial flange section 32. Flange section 32 is connected to one end of the tubular section 30. Tubular section 26 extends axially and radial flange section 32 extends radially. Bushing part 28 is a radial member 34 that includes a center opening 36. Preferably, but not necessarily, the radial length of member 34 substantially equals the radial length of flange section 32 measured from the outside diameter of the tubular section 30.

A through opening 38 is provided in a work member 40 to receive the bushing 25. An initial opening 38 is formed by use of a drill. The drilled opening is then reamed to provide a desired starting diameter. After reaming, the starting diameter is verified by use of a hole-diameter gauge. If the opening 38 is oversized, it must be reworked to provide it with a proper slightly larger diameter. An appropriate primer may be applied to the opening 38.

FIGS. 6-8 show the bushing 28 in the process of being installed into the opening 38 in a work member 40, shown in the form of a structural wall 40. The tubular section 30 of bushing part 26 has an outside diameter substantially corresponding to the diameter of opening 38. Tubular section 30 has a length that is slightly longer than the length of the opening 38, so as to provide it with an end portion 42 that projects axially outwardly from the second wall 44 of the member 40 when the flange 32 is against the first wall 46 of the member 40. The opening 36 in member 34 has a diameter substantially corresponding to the outside diameter of end part tubular section 30. End portion 42 has a length substantially corresponding to the thickness of the member 34.

As shown by FIG. 6, the tubular section 30 of member 26 is inserted into the opening 38, from the first side of the member 40. It is moved axially through the opening 38 until the radial flange 32 contacts sidewall 48. When this happens, the end portion 42 of tubular section 30 projects axially outwardly of the opening 30, beyond the second surface 44. It may be desirable to apply a sealant to the inwardly side of the flange 32. Next, the second bushing part 28 is installed on this end portion 42. Bushing part 28 is moved towards the end portion 42 until the end portion 42 is inside the opening 36. It might be desirable to apply a sealant to the inward surface of bushing part 28. Then, the mandrel M is inserted through the tubular section 30, from the first side of the member 40. Its inner end portion 20 is connected to a piston inside of the puller 12, such as is disclosed in U.S. Pat. No. 5,433,100, with reference to FIGS. 20 and 21 of that patent. Following connection of the mandrel M to the puller 12, mandrel section 22 is inside the tubular section 30 and the enlarged end portion 24 of the mandrel M is spaced from the first side 46 of member 40. The surface 16 on nose piece 14 is positioned against member 34 such that member 34 is clamped between surface 16 and surface 44. Then, the puller 12 is operated to retract the mandrel M and pull it through the tubular section 30.

FIG. 7 shows the mandrel M in the process of being retracted and shows its enlarged end portion 24 in the process of stretching and enlarging tubular section 30 both radially and circumferentially as it moves through tubular section 30. During this movement, the drag of the mandrel head 24 on the tubular section 30 pulls the flange 32 of bushing part 26 tight against surface 26. A reaction to the pulling force moves the nose piece 14 forwardly to place its forward surface 16 into tight contact with the radial member 34. Thus, movement of the mandrel M pulls flange 32 into tight contact with surface 46 and pushes the member 34 into tight contact with surface 44. At the same time, the tubular section 30 is expanded to make a tight interference fit with the sidewall of opening 38. As the enlarged portion 22 of the mandrel M moves through the end portion 42 of tubular section 38, it radially and circumferentially expands the end portion 42, causing a tight interference fit between it and the sidewall of opening 36 in member 34.

FIG. 8 shows the mandrel M fully retracted within the nose piece 14 of the puller 12. The end portion 25 of the mandrel M has been moved entirely through the tubular section 30. As a result, the puller 12 and mandrel M are freely movable away from the installed bushing 26, 28. FIG. 8 shows an axial space 48 starting to form between side surface 44 of member 40 and end surface 16 of nose piece 14. It further shows the bushing parts 26,28 installed within the opening 18. The installed bushing parts 26, 28, are also shown in FIG. 12, with the puller 12 having been moved away from the work member 40.

Following its installation, the inside surface of the tubular section 30 might be slightly tapered. In that case the opening in tubular section 30 may be reamed to a desired inside diameter and to remove lubricant residual. The lubricant residual may be present because it is common practice to use a lubricant between a mandrel M and a bushing through which the mandrel M is moved.

Movement of the mandrel M through the bushing 25 expands the tubular section 30 beyond elastic expansion and into plastic expansion. That is, the material is expanded a sufficient amount that it will assume and retain a new diameter.

Figure 9:
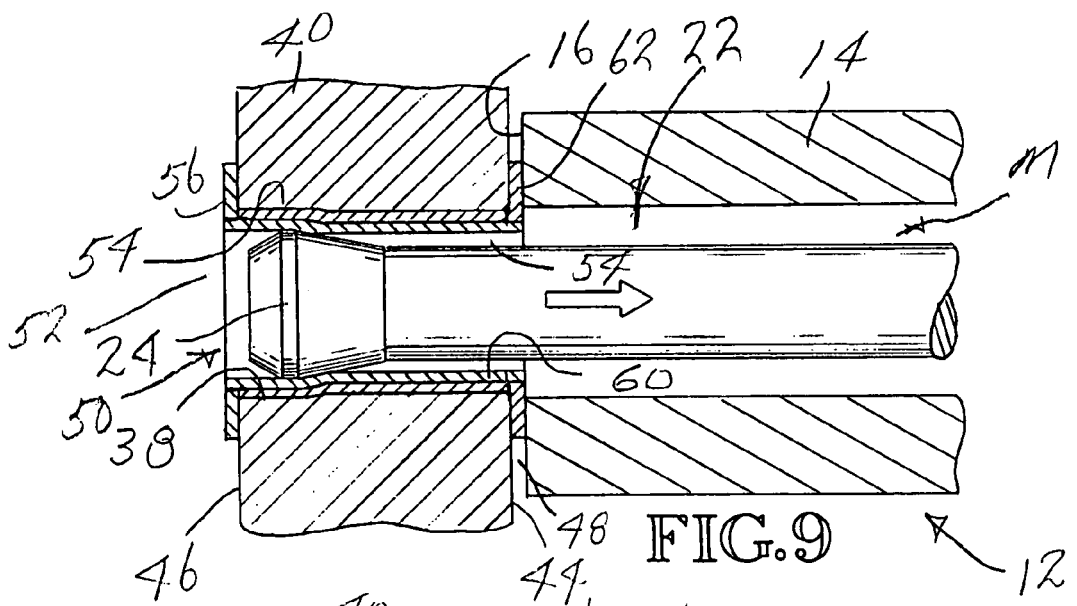
FIG. 9 is a view like FIG. 7, but showing the tooling being used to install a bushing of the type shown by FIG. 3.

FIGS. 3, 9 and 13 show another form of two part bushing 50. A first bushing part 52 has a tubular section 54 and a radial flange section 56 at one end of the tubular section 54. As shown by FIGS. 9 and 13, the tubular section 54 has an outside diameter substantially conforming to the opening 38 in the work member 40. Tubular section 54 has a length measured from the inside of flange section 56 to its opposite end that substantially corresponds to the length of the opening 38. Bushing part 58 has a tubular section 60 and a radial flange section 62 connected to one end of the tubular section 60. Tubular section 60 has an outside diameter substantially conforming to the inside diameter of tubular section 54. It has a length substantially conforming to the length of the opening in tubular section 54.

The opening 38 is formed and prepared in the manner described above. Primer may be applied to the inside of the opening 38. Sealant may be applied to the inside surfaces of the flanges 56, 62 of the bushing 50. The bushing 50 is installed in the following manner. The tubular section 54 of bushing part 52 is inserted into the opening 38 in the work member 40, from the first side of the work member 40. It is then pushed axially inwardly until the inner surface of flange section 56 contacts the side surface 46 on the work member 40. Then, the tubular section 60 of the bushing part 58 is installed into the opening in bushing section 54, from the second side of the work member. It is moved inwardly until the inner surface of flange section 62 contacts the sidewall 44 of work member 40. Next, as shown by FIG. 9, the mandrel M and puller 12 are used to radially and circumferentially expand the two tubular sections 54, 60. The mandrel M is installed in the manner described above in connection with FIGS. 6–8 and a lubricant is used between it and the bushing 50. It is then pulled axially into the puller 12 so as to move its enlarged end portion 24 axially through tubular section 60, as shown in FIG. 9. As it moves, the mandrel head 24 radially and circumferentially expands both tubular section 60 and tubular section 54. This expansion makes a tight interference fit between tubular section 54 and the sidewall of opening 38 and makes a tight interference fit of tubular section 60 within tubular section 54. This connects tubular portion 54 to the sidewall of opening 38 and connects tubular portion 60 to tubular portion 54. As can be seen from FIG. 9, movement of the mandrel M through the tubular section 54 applies a drag force on the bushing part 52 that pulls the flange section 56 into tight contact with the wall 46 of work member 40. The end surface 16 of nose piece 14 is pressed by reaction forces tightly against flange section 62, moving flange section 62 into tight engagement with sidewall 44 of work member 40.

Figure 10:
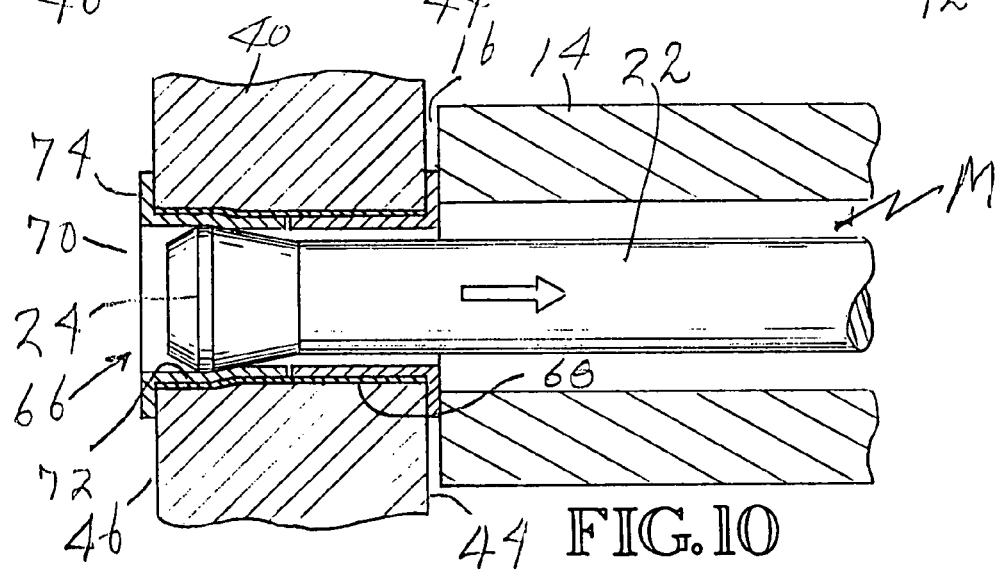
FIG. 10 is a view like FIGS. 7 and 9, but showing the tooling being used to install a bushing of the type shown by FIG. 4.
Figure 11:
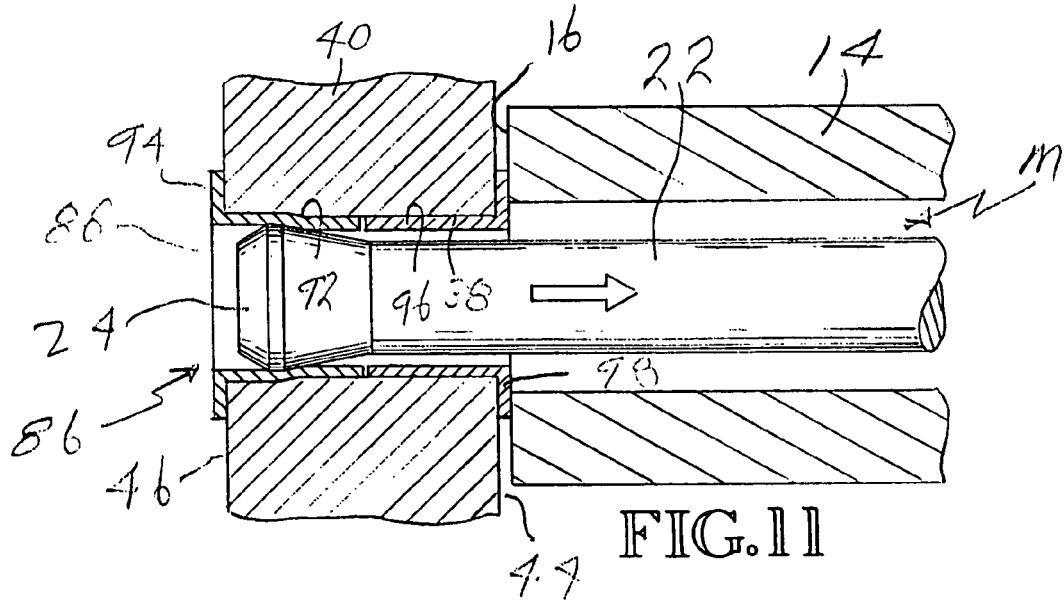
FIG. 11 is a view like FIGS. 7, 9 and 10 but showing the tooling being used to install a bushing of the type shown by FIG. 5.

FIGS. 4, 10 and 14 disclose a third embodiment of the bushing. This bushing 66 has three parts. A tubular first bushing part 68 has an outside diameter and a length that correspond to the diameter and length of opening 38 in work member 40. The second bushing part 70 has a tubular section 72 and a radial flange section 74 at one end of the tubular section 72. It has an outside diameter substantially conforming to the inside diameter of bushing part 68. It has a length that is shorter than the opening 38 in work member 40. The third bushing part 76 has a tubular section 78 and a radial flange section 80 at one end of the tubular section 78. Preferably, bushing parts 70, 76 are alike. Preferably also, the tubular sections 72, 78 are substantially the length of tubular section 68 and the opening 38 in the work member 40.

Bushing 66 is installed in the following manner. Firstly, bushing part 68 is placed in the opening 38 in work member 40. Then, tubular section 72 of bushing part 70 is inserted into the bushing part 68 from the first side of the work member 40. Bushing part 76 is inserted into the bushing part 68 from the opposite side of the work member. The bushing parts 70, 76 are moved toward each other until radial flange 74 is substantially against side surface 46 and radial flange 80 is substantially against side surface 44. Then, the mandrel M and the puller 12 are used in a manner described above in connection with the first two embodiments. Axial movement of the enlarged end portion 24 of the mandrel M through the bushing parts 68, 70 radially and circumferentially expands tubular sections 72, 78, 68. As a result, bushing part 68 is moved into a tight interference fit with the sidewall of opening 38. Tubular sections 72, 78 and bushing part 70, 78 are moved into a tight interference fit with bushing part 68. Flange section 74 is pulled into tight contact with side surface 46 and flange section 80 is pushed into tight contact with side surface 44. The expansion connects bushing part 68 to the side surface of opening 38 and connects tubular sections 72, 78 of bushing parts 70, 76 to bushing part 68. Tubular sections 72, 78 may have concentric overlapping portions where they meet. This is shown by FIG. 17. End portion 72' is shown to concentrically surround end portion 78'.

FIGS. 5, 8 and 15 show a fourth embodiment of the bushing. This bushing 86 is composed of two bushing parts 88, 90, which are preferably identical in construction. Bushing part 88 has a tubular section 92 and a radial flange section 94 that is connected to one end of the tubular section 92. Bushing part 90 has a tubular section 96 and a radial flange section 98 that is connected to one end of the tubular section 96. The outside diameters of the tubular sections 92, 98 substantially conform to the diameter of the opening 38 in the work member 40. The tubular sections 92, 96 are both shorter than the opening 38 but, preferably, their combined lengths substantially equal the length of the opening 38 (FIG. 15). The tubular sections 92, 96 may have concentric end portions that form a lap joint where they meet. End part 92' concentrically surrounds end part 96'.

The bushing 86 is installed in the following manner. The tubular sections 92, 96 are either installed separately or together into the opening 38 from opposite sides of the work member. The bushing parts 86, 90 are moved axially together until flange section 94 substantially contacts sidewall 46 and flange section 98 substantially contacts side surface 44. Then, the mandrel 20 and the puller 12 are used in the manner described above for radially and circumferentially expanding the tubular sections 92, 98 in the opening 38. As previously described, axial movement of the mandrel 20 through the tubular sections of the bushing acts to pull flange section 94 against sidewall 46 and push flange section 98 against sidewall 44.

Preferably, the installation of bushings 50, 66, 86 includes radially and circumferentially expanding the tubular sections of the bushing parts an amount sufficient to introduce fatigue life enhancing compressive residual stresses in the work member immediately around the opening 38 in the work member 40.

The various bushing parts that have been described can be made from any suitable metal that has to date been used for making bushings and from new materials that might be developed for use in making bushings, or for use in making other structures but suitable for use in making bushings. Typical examples are bronze, bronze alloys, brass, brass alloys, aluminum, aluminum-nickel-bronze, copper beryllium, stainless steels and Inconel and other high temperature engine alloys, alloys, and carbon steels, etc. The work member 40 may be a structural wall or it may be some other structural member. It may be made from metal or composite materials.

The illustrated embodiments are only examples of; the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A dual bushing installation comprising:

an outer metal bushing comprising a first body having a first end, an opposite end, and prior to installation, the outer metal bushing includes a single radial flange, the first end and the opposite end connected by a circumferentially seamless outer surface having an outer circumference and a circumferentially seamless inner surface having an inner circumference, the circumferentially seamless inner surface adjacent a first opening that extends through the first body, the single radial flange of the outer bushing proximate the first end of the outer metal bushing;

an inner metal bushing comprising a second body having a first end, a second end, and prior to installation, the inner metal bushing includes a single radial flange, the first end and the second end connected by a circumferentially seamless outer surface having an outer circumference and a circumferentially seamless inner surface having an inner circumference, the circumferentially seamless inner surface of the inner bushing adjacent a second opening that extends through the second body, the single radial flange of the inner bushing proximate the second end of the inner metal bushing;

wherein the outer circumference of the inner metal bushing substantially conforms with the inner circumference of the outer metal bushing such that the inner metal bushing is closely received by the first opening of the outer metal bushing; and wherein the inner metal bushing is rotationally and translationally fixed relative to the outer metal bushing because of a sufficient radial displacement initiated at the circumferentially seamless inner surface of the inner bushing, which provides a substantially equal, outwardly radial displacement throughout nearly all of a longitudinal length of the circumferentially seamless outer surface of the inner metal bushing and nearly all of a longitudinal length of the circumferentially seamless inner surface of the outer metal bushing such that substantially uniform stresses are provided along the longitudinal lengths of the inner bushing and the outer bushing.

2. The installation of claim 1 wherein the circumferences are diameters.

3. The installation of claim 1 wherein the dual-bushing installation kit is received in an opening of a structural work member.

4. The installation of claim 1 wherein the amount of radial displacement achieved at the circumferentially seamless outer surface of the outer metal bushing is dependent, in part, on the modulus of elasticity and the ultimate strength of the first and second metal bushings.

5. The installation of claim 1 wherein the first body and the second body are cylindrical and concentric with respect to one another.

6. The installation of claim 1, further comprising:
a solid metal structural wall having an opening extending between the single radial flange of the outer metal bushing and the single radial flange of the inner metal bushing, the entire circumferentially seamless outer surface of the outer metal bushing contacts all of a longitudinal length of a surface of the opening of the structural wall.

7. The installation of claim 1 wherein the inner circumference of the inner metal bushing is uniform along all of a longitudinal length of the circumferentially seamless inner surface of the inner metal bushing.

8. The installation of claim 1 wherein the entire circumferentially seamless inner surface of the inner metal bushing defines a passageway having a uniform axial cross-section throughout all of a longitudinal length of the circumferentially seamless inner surface of the inner metal bushing.

9. A dual bushing installation kit comprising:
a first metal bushing comprising a first body having first and second ends, the first and second ends connected by a first outer surface having a first outer circumference and a first inner surface having a first inner circumference, the first inner surface surrounding a first opening that extends through the first body;
a second metal bushing defined by a second body having first and second ends, the first and second ends connected by a second outer surface having a second outer circumference and a second inner surface having a second inner circumference, the second inner surface surrounding a second opening that extends through the second body;
wherein the second outer circumference dimensioned to be substantially conforming with the first inner circumference such that the second bushing is closely receivable by the first opening of the first bushing;
wherein sufficient radial displacement initiated at the second inner surface of the second body results in substantially equal displacement of both the second outer circumference and the first inner circumference in an outwardly radial direction; and
wherein the first body and the second body are elliptical, the first inner surface of the first bushing having a first elliptical profile that substantially conforms to a second elliptical profile defined by the second outer surface of the second bushing.

10. A radially, cold-expandable, dual bushing assembly comprising:
an outer metal bushing comprising a first body having a first end, an opposite end, and prior to installation, the outer metal bushing includes only one radial flange, the first end and the opposite end connected by a first circumferentially seamless outer surface and a first circumferentially seamless inner surface, the first circumferentially seamless inner surface adjacent a first opening that extends through the first body, the only one radial flange of the outer bushing proximate the first end of the outer metal bushing;
an inner metal bushing comprising a second body having a first end, a second end, and prior to installation, the inner metal bushing includes only one radial flange, the first end and the second end connected by a second circumferentially seamless outer surface and a second circumferentially seamless inner surface, the second circumferentially seamless inner surface adjacent an opening that extends through the second body, the only one radial flange of the inner bushing proximate the second end of the inner metal bushing;
wherein the second circumferentially seamless outer surface of the inner metal bushing is received in and substantially conforms with the first circumferentially seamless inner surface of the outer metal bushing;
wherein the inner and outer bushings are radially expanded by a like amount because of the second circumferentially seamless inner surface of the second body being radially displaced; and
wherein compressive stresses are developed in the inner metal bushing, the outer metal bushing, and in an area of a work member that receives the outer metal bushing because of the second circumferentially seamless inner surface of the second body being radially displaced, the compressive stresses being sufficient to increase the fatigue life of the work member.

11. The assembly of claim 10 wherein an amount of radial displacement of the second circumferentially seamless outer surface of the second metal bushing depends, in part, on the modulus of elasticity and the ultimate strength of the first and second metal bushings.

12. The assembly of claim 10 wherein the first body and the second body are cylindrical and concentric with respect to one another.

13. The assembly of claim 10 wherein the compressive stresses are substantial uniform along nearly all of a longitudinal length of the inner bushing and nearly all of a longitudinal length of the outer bushing.

14. A radially, cold-expandable, dual bushing assembly comprising:
a first, non-expanded, metal bushing defined by a first body having first and second ends, the first and second ends connected by a first outer surface and a first inner surface, the first inner surface surrounding a first opening that extends through the first body;
a second, non-expanded, metal bushing defined by a second body having first and second ends, the first and second ends connected by a second outer surface and a second inner surface, the second inner surface surrounding an opening that extends through the second body;
wherein the bushings in their non-expanded state provide for the second outer circumference dimensioned to be substantially conforming with the first inner circumference such that the second bushing is closely insertable into the first opening of the first bushing;
wherein the non-expanded bushing assembly is capable of substantially equal displacement of both the second outer circumference and the first inner circumference in an outwardly radial direction when a radial displacement is initiated at the second inner surface of the second body;
wherein compressive stresses are developed in the first bushing and compressive stresses are further developed in an area of a work member that is contiguous with and substantially surrounding the first bushing when the radial displacement is initiated at the second inner surface of the second body, the compressive stresses being sufficient to increase the fatigue life of the work member; and
wherein the first body and the second body are elliptical, the first inner surface of the first bushing having a first elliptical profile that substantially conforms to a second elliptical profile defined by the second outer surface of the second bushing.

* * * * *